(No Model.) 10 Sheets—Sheet 1.

B. WILLIAMS.
APPARATUS FOR FORMING SECTIONS OF UNDERGROUND ELECTRICAL CONDUITS OF PLASTIC MATERIAL.

No. 301,547. Patented July 8, 1884.

(No Model.) 10 Sheets—Sheet 3.

B. WILLIAMS.
APPARATUS FOR FORMING SECTIONS OF UNDERGROUND ELECTRICAL CONDUITS OF PLASTIC MATERIAL.

No. 301,547. Patented July 8, 1884.

Fig. 3.

Witnesses.
H. C. McArthur
C. Johnson

Inventor.
Benezette Williams
per
H. Harrison
Attorney.

(No Model.) 10 Sheets—Sheet 4.

B. WILLIAMS.
APPARATUS FOR FORMING SECTIONS OF UNDERGROUND ELECTRICAL CONDUITS OF PLASTIC MATERIAL.

No. 301,547. Patented July 8, 1884.

(No Model.) 10 Sheets—Sheet 5.

B. WILLIAMS.
APPARATUS FOR FORMING SECTIONS OF UNDERGROUND ELECTRICAL CONDUITS OF PLASTIC MATERIAL.

No. 301,547. Patented July 8, 1884.

(No Model.)

B. WILLIAMS.
APPARATUS FOR FORMING SECTIONS OF UNDERGROUND ELECTRICAL CONDUITS OF PLASTIC MATERIAL.

No. 301,547.

Patented July 8, 1884.

(No Model.) 10 Sheets—Sheet 9.

B. WILLIAMS.
APPARATUS FOR FORMING SECTIONS OF UNDERGROUND ELECTRICAL CONDUITS OF PLASTIC MATERIAL.

No. 301,547. Patented July 8, 1884.

UNITED STATES PATENT OFFICE.

BENEZETTE WILLIAMS, OF CHICAGO, ILLINOIS.

APPARATUS FOR FORMING SECTIONS OF UNDERGROUND ELECTRICAL CONDUITS OF PLASTIC MATERIAL.

SPECIFICATION forming part of Letters Patent No. 301,547, dated July 8, 1884.

Application filed October 11, 1883. (No model.)

*To all whom it may concern:*

Be it known that I, BENEZETTE WILLIAMS, a citizen of the United States, residing at Chicago, in the county of Cook and State of Illinois, have invented certain new and useful Improvements in Apparatus for Forming Sections of Underground Electrical Conduits of Plastic Material, of which the following is a specification, to wit:

This invention relates to apparatus for forming sections of underground electrical conduits of plastic material; and it consists in the peculiar construction and arrangement of the same, substantially as will be hereinafter more fully set forth, and pointed out in the claims.

In order to enable others skilled in the art to which my invention appertains to make and use the same, I will now proceed to describe its construction and operation, referring to the accompanying drawings, in which—

Fig. 3 is a top plan view, partly in section. Fig. 6 is a vertical section of the water-chamber and its guides.

Figure 1:
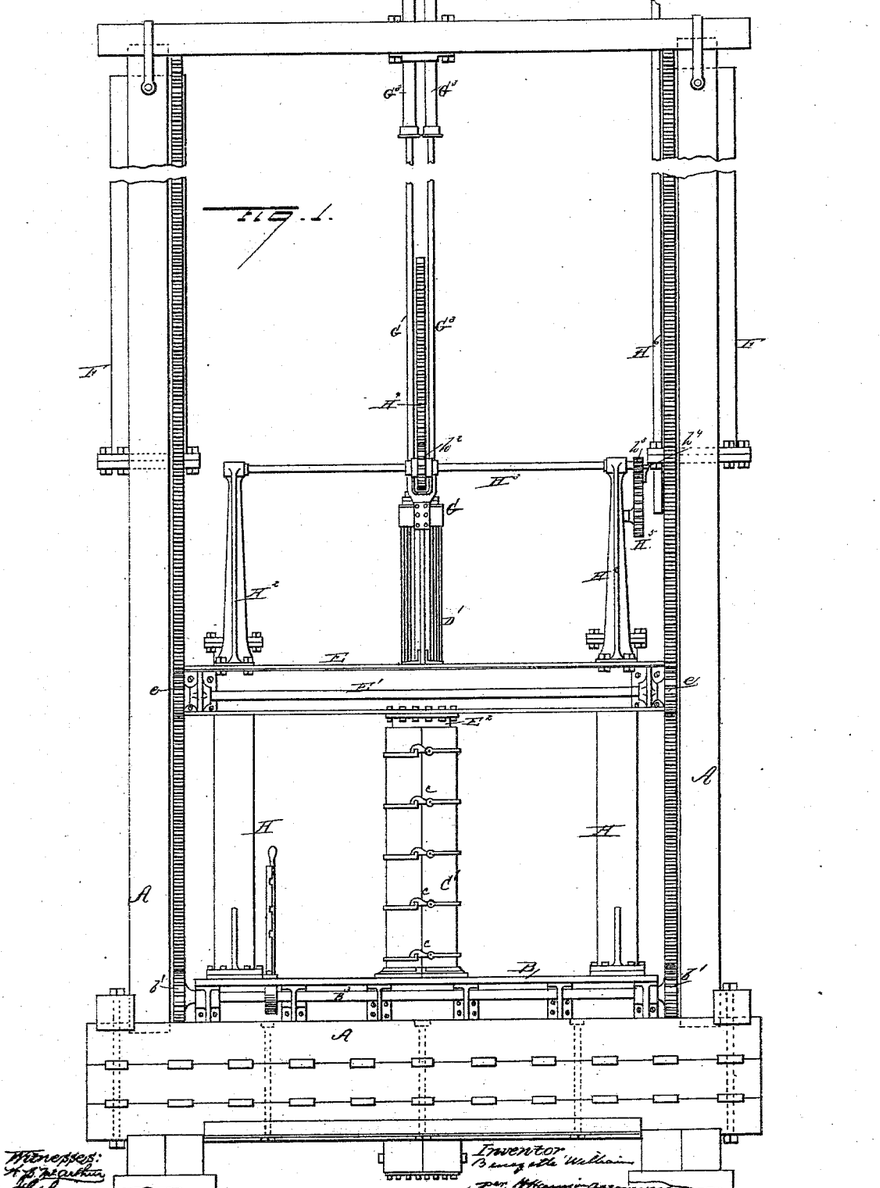
Figure 1 is a side elevation of my invention.
Figure 2:
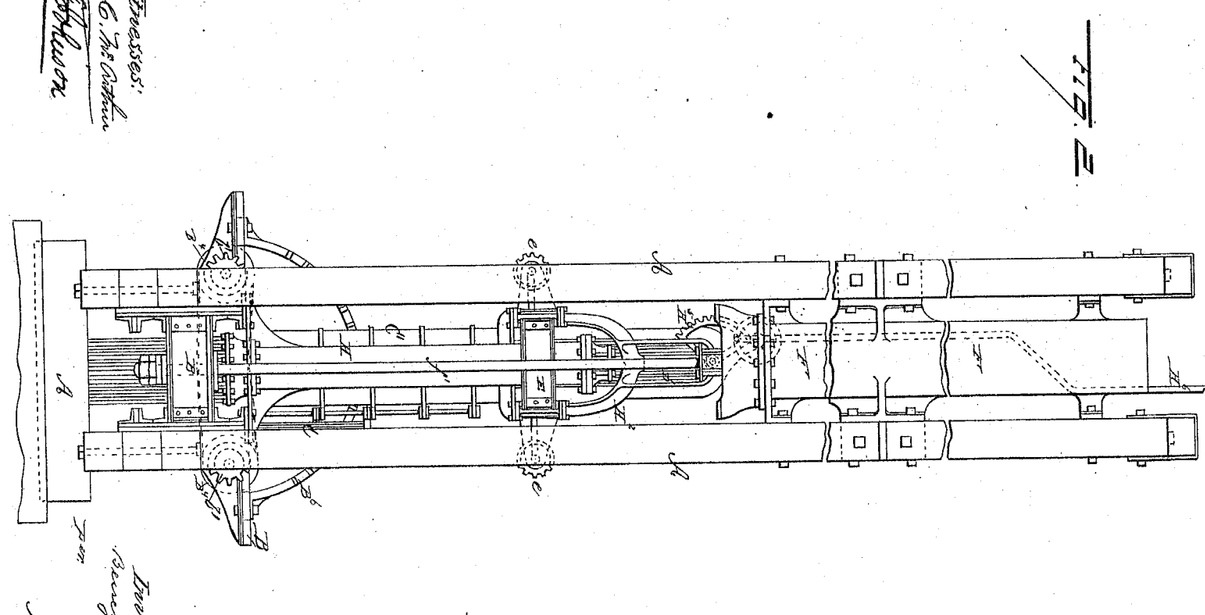
Fig. 2 is an end elevation.
Figure 4:
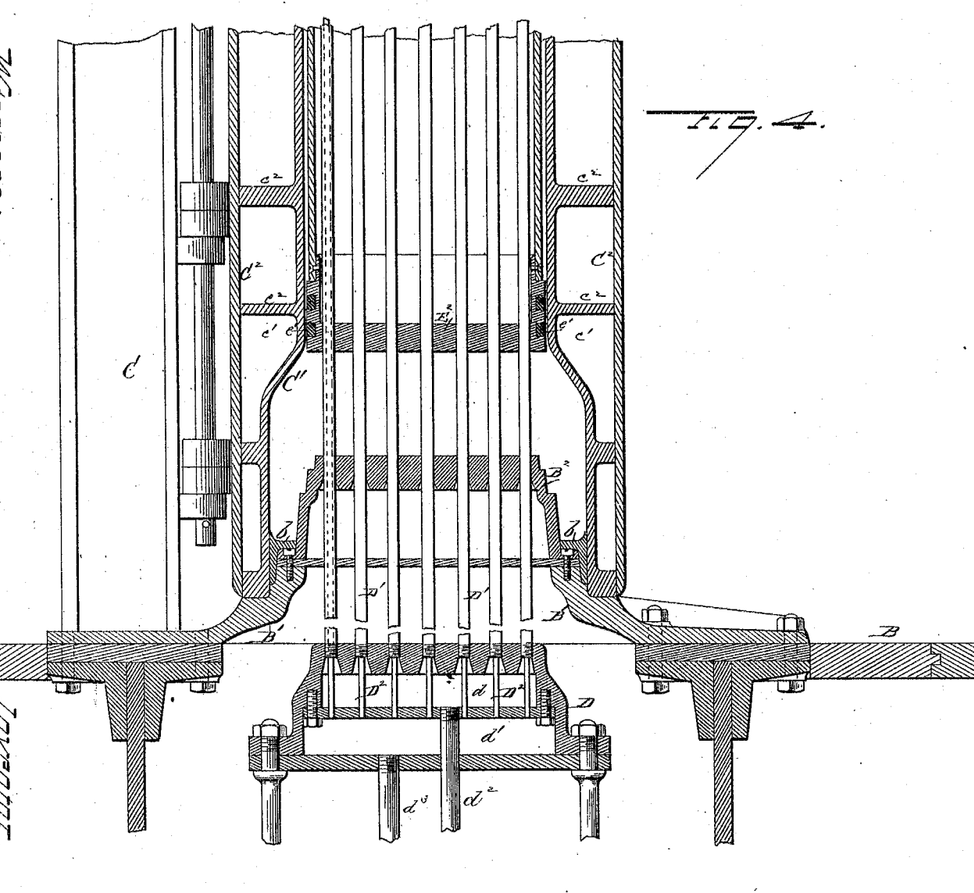
Fig. 4 is an enlarged vertical section of the lower part of the mold, the steam-chamber, and its circulating tubes or cores.

A represents the frame of my apparatus, consisting of four uprights secured upon a suitable base, as represented in Figs. 1 and 2; and B represents a movable platform, upon the center of which is bolted an annular casting, B', bearing a casting, B², of inverted-cup shape, which forms the core for the bell end of the section, as represented in Fig. 4, around the base of which rests a loose annular ring, $b$, upon which the edge of the bell rests, and which is lifted out with the section after casting.

Figure 10:
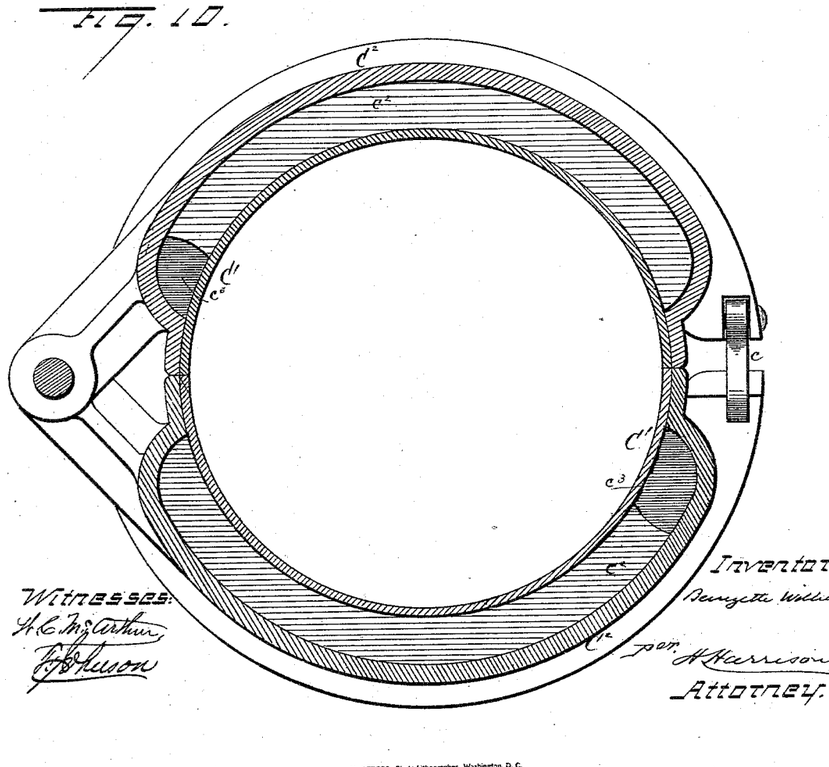
Fig. 10 is a cross-section of the main or outer mold.

To an upright, C, secured upon the movable platform beside the annular casting B', is hinged the outer shell, C', of the mold, which is divided vertically into two parts, and provided with suitable hooks, $c$, for securing them when closed. Each portion of this mold is provided with a casing, C², between which and the main portion of the mold is a space, $c'$, divided by horizontal webs $c^2$, which have openings $c^3$ formed in them at alternate ends, as seen in Fig. 10. The two portions of the mold are also provided with inlet and outlet connections with suitable pipes, by which a circulation of steam or hot water is kept up through the jacketed mold by means of its webs and their alternate openings, as already described and claimed in an application now on file in the Patent Office. This mold is placed upon the platform, with the bell end downward, as represented in Figs. 4 and 5.

Below the platform B, in a position immediately beneath the mold C', is secured the steam-head D, divided into an upper or supply chamber, $d$, and a lower or exhaust chamber, $d'$, with which are connected the supply and exhaust pipes $d^2\ d^3$, as represented in Fig. 4; or the functions of these chambers may be reversed, if desired. In the upper side of this head D are secured a number of tubes, D', forming cores for the wire cells of the casting. These core-tubes D' extend upward through the annular cup-shaped bell-core and through the mold, and have their upper ends removably secured in a water-head, as will be presently described.

Figure 5:
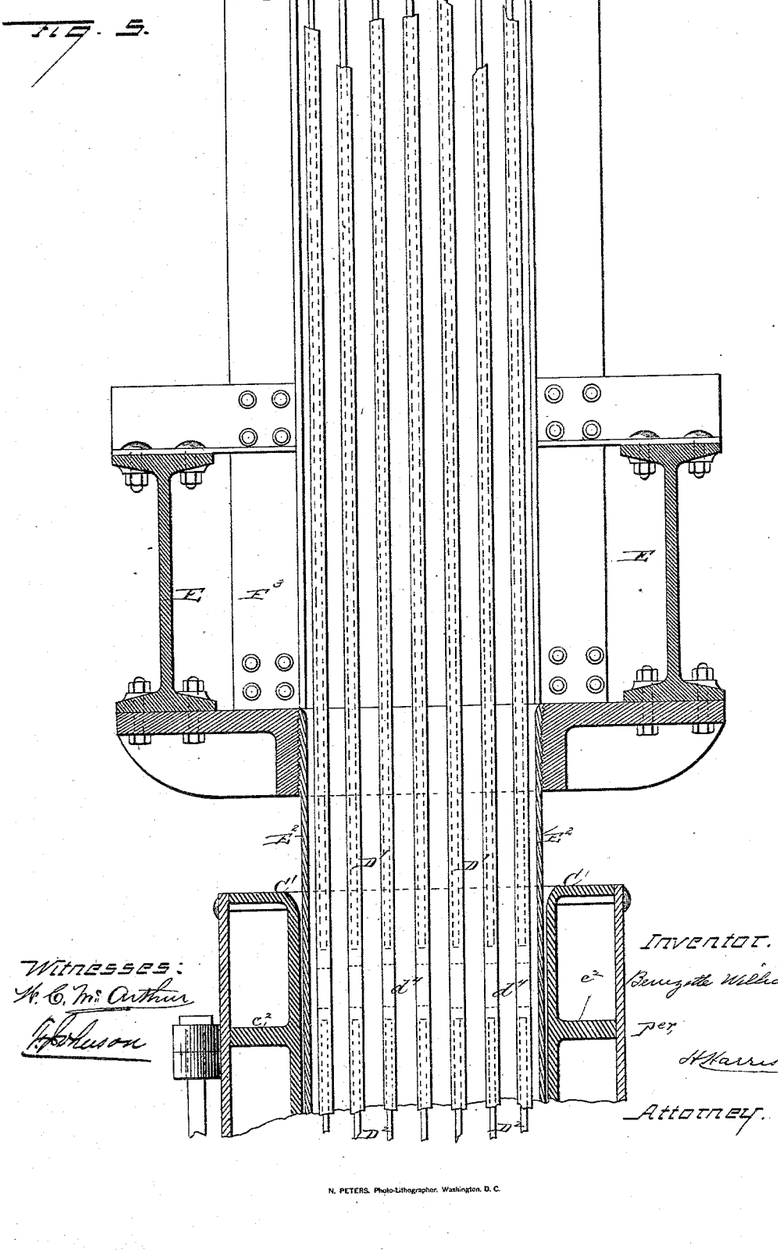
Fig. 5 is a vertical section of the central portion of the core-tubes, the upper part of the mold, and piston or follower.

At a point about even with the top of the jacketed two-part mold C' when at its lowest point, the tubes D' are either plugged or made solid, as represented by dotted lines at $d^4$ in Fig. 5, in order to prevent any communication between their upper and lower ends. Within the tubes D' are secured a series of smaller tubes, D², the lower ends of which pass through the upper chamber of the steam-head D and communicate with the lower one, and their upper ends extend within the core-tubes D' nearly to their plugged or solid centers $d^4$, as clearly represented by dotted lines in Fig. 5.

Beneath the platform B, in the frame which supports it, are journaled two shafts, B³ B³, running across the machine, and provided on each end with a gear or pinion, $b'$, which latter engage with vertical toothed rack-bars $b^2$, secured to the uprights of the main frame, and which serve to guide the platform in its vertical movements. These shafts $B^3$ thus connect the two ends of the platform, and as the gears are rigidly secured thereon, a quicker movement of the lifting-piston of one of the cylinders (as hereinafter described) than the other will be communicated to both ends of the platform, and it is thus kept always level and prevented from any twist or strain.

Figure 11:
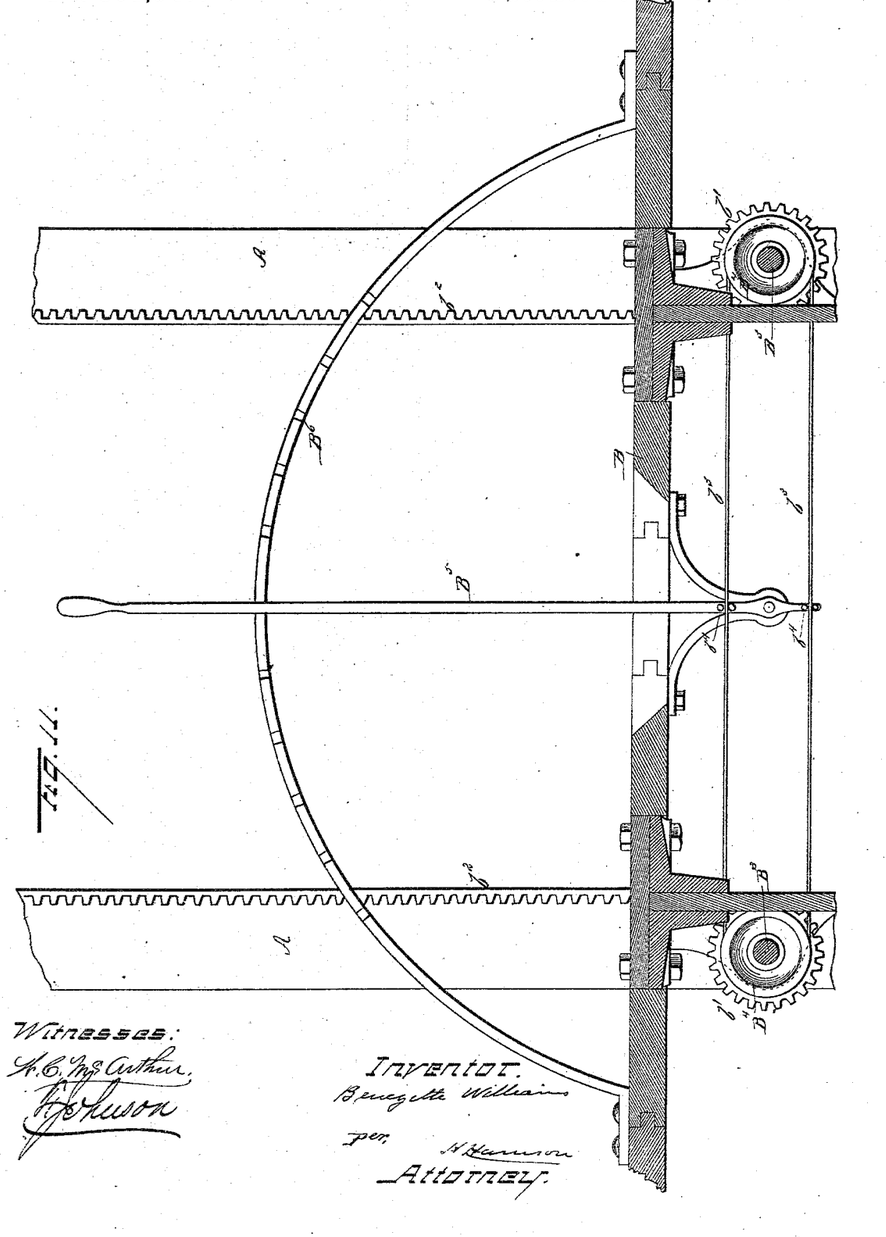
Fig. 11 is a cross-section of the main platform, showing the brake mechanism.

Upon the shafts $B^3$ are also secured the belt or grooved wheels $B^4$, around which extends a loose belt, $b^3$, which does not turn with the pulleys, but remains stationary, and which acts as a brake to hold the platform from any movement, as follows: I provide a hand lever or brake, $B^5$, which is fulcrumed at a proper point below the platform B, and provided with two sets of small pins, $b^4$ $b^4$, between which the belt $b^3$ runs, and which clutch or kink the belt as the lever is thrown to one side or the other, and prevent the belt from moving, thereby retaining the frame at any desired point upon the vertical rack-bars, and a segment-rack, $B^6$, with which the brake-lever is adapted to engage, as shown in Fig. 11, serves to lock it at any point.

Above the top of the mold $C'$ is located a rectangular frame, E, also carrying two shafts, $E'$ $E'$, provided with pinions or gears $e$ $e$ upon their ends, and traveling upon the vertical rack-bars, as described in reference to the platform B. This frame is in its center provided with a downwardly-projecting cylinder, $E^2$, forming a hollow piston or plunger, which, as the frame E is raised or lowered, is withdrawn from or projected into the mold $C'$, it being formed of a size to accurately fit this mold, and furnished with suitable packing, $e'$, at its lower end, which is also perforated, for the passage of the core-tubes $D'$.

Figure 9:
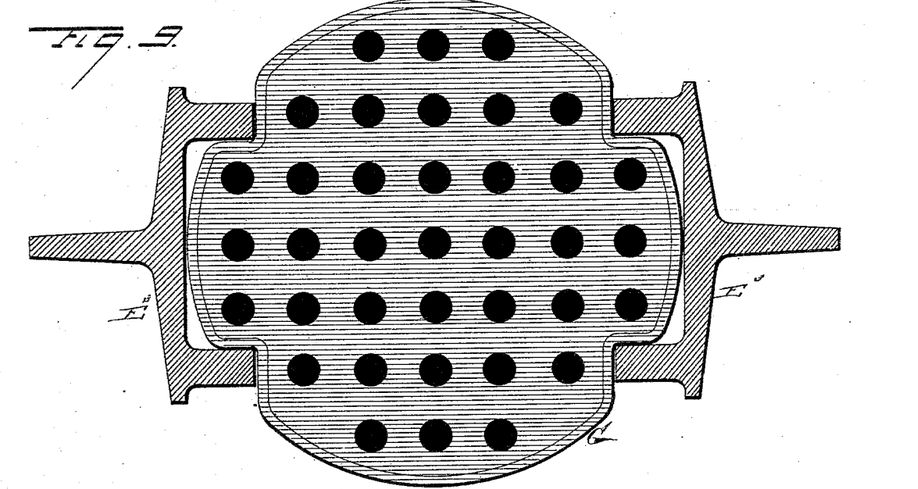
Fig. 9 is a bottom view of the water-chamber.

Upon the frame E are secured two flanged uprights or posts, $E^3$ $E^3$, preferably of a form in cross-section similar to that shown in Fig. 9, and between these uprights is guided the water-head G. This water-head is divided into separate chambers $g$ $g'$, as described, for the steam-head D, and with these chambers connect two pipes, $G'$ $G^2$, which extend upward into two stand pipes or cylinders, $G^3$, provided with suitable stuffing-boxes at their lower ends, and connected at any point to the supply and waste pipes from a tank or pump; and it will be readily understood that as the water-head rises and falls the pipes $G'$ $G^2$ are pushed into or withdrawn from the stand-pipes $G^3$, and allow for the movement of the head without breaking the continuous circulation of water.

The lower chamber, $g'$, of the water-head is provided with a rubber or elastic plate, $G^4$, formed with nipples $G^5$, in which are secured and held in such manner as to be water-tight, but easily removed, the upper ends of the core-tubes $D'$. Within these tubes are also smaller tubes, $d^5$, which communicate with the upper chamber, $g$, of the water-head, and their lower ends extend downward nearly to the solid centers $d^4$ of the core-tubes.

Figure 7:
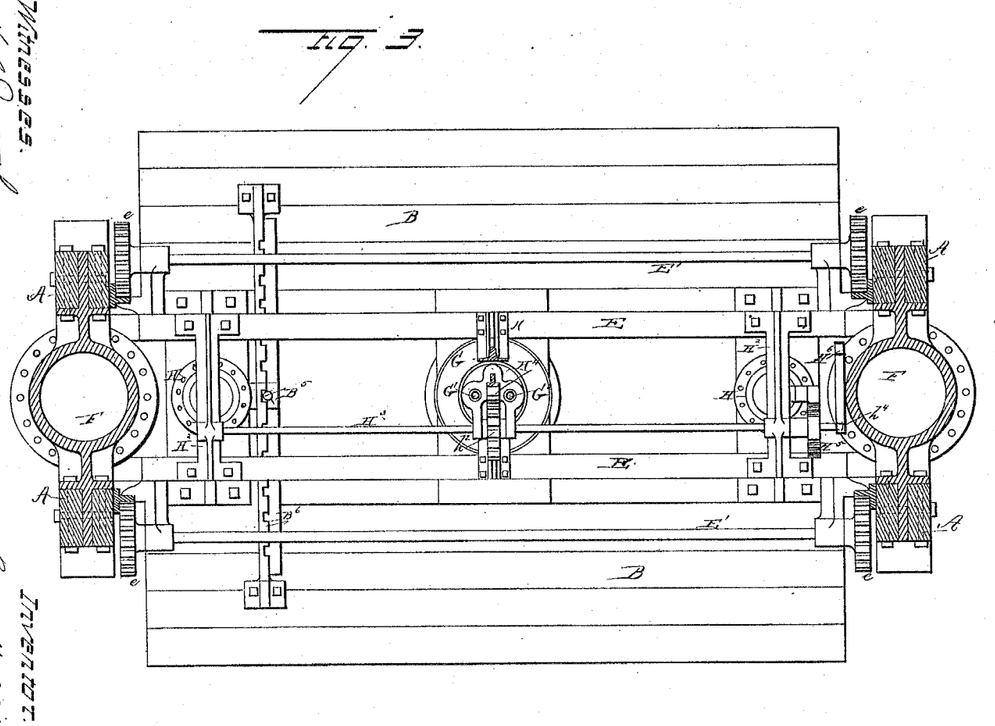
Fig. 7 is a broken vertical section of the lower end of the main hydraulic cylinder and its connection with the main platform.
Figure 8:
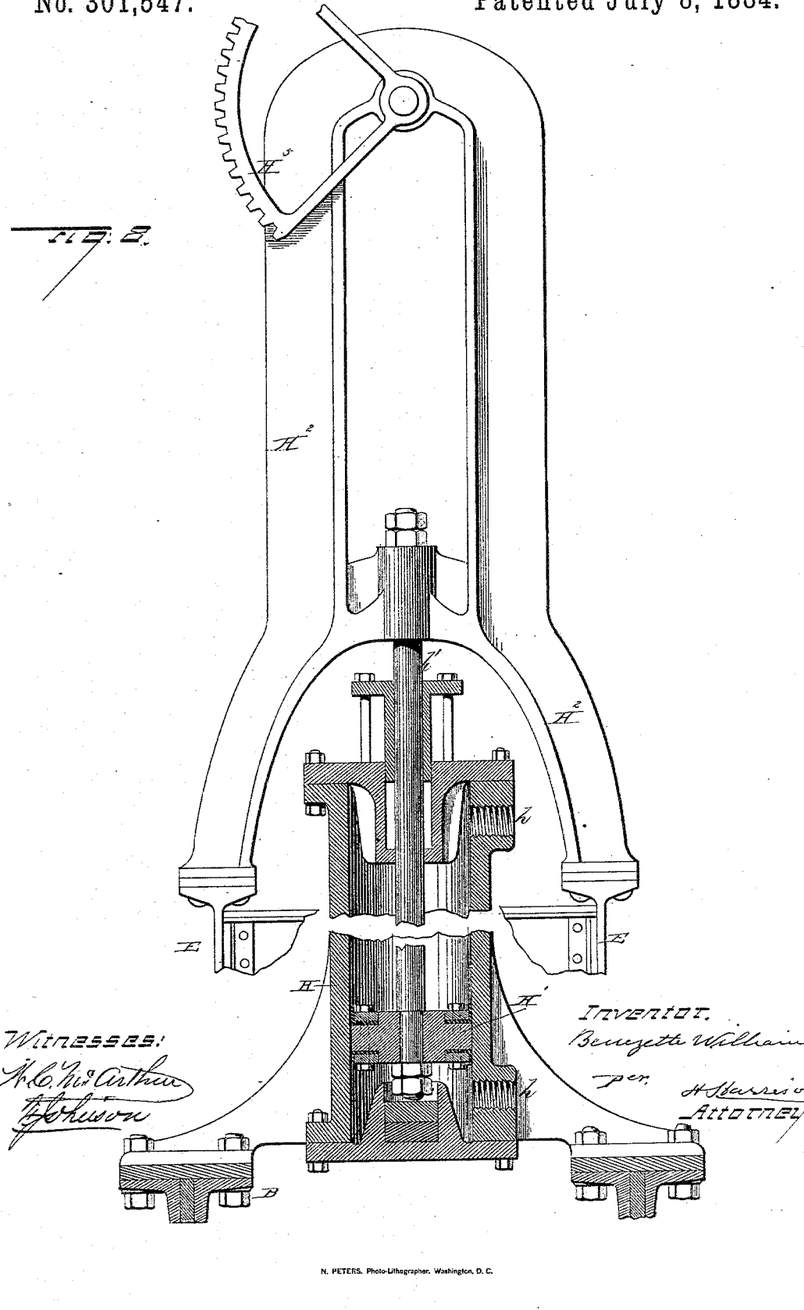
Fig. 8 is a vertical section of the cylinders controlling the piston, and their connection with the frame.

Between the uprights of the main frame, near their upper ends, are secured two cylinders, F F, having their upper ends open and their lower ends closed by the usual head, and provided with a port, $f$, for the admission and escape of water. Each cylinder is provided with a piston-head, $F'$, and rod $f'$, which extends downward, and is secured at its lower end in the platform B, as seen in Fig. 7. These hydraulic cylinders are connected to a tank or pump, and water is supplied as required to lift the platform with its appliances in the process of casting the sections.

Upon each end of the platform B is also secured a hydraulic or steam cylinder, H H, having a port, $h$, at either end, and provided with a piston-head, $H'$, whose rod $h'$ is connected at its upper end with a casting or frame, $H^2$, secured upon the movable rectangular frame E, by which means this frame and its plunger may be given a vertical movement independent of the platform B when desired. The castings $H^2$ are extended above their connection with the piston-rods $h'$, and have journaled in boxes in their upper ends a shaft, $H^3$, which carries a pinion or spur-gear, $h^2$, meshing with a rack-bar, $H^4$, secured upon a rod extending upward from the water-head, and between which rack-bar and the head G is a space to allow of the full movement of the plunger-frame E independent of the water-head. This shaft $H^3$ also has a spur-wheel, $h^3$, upon one end, with which engages a spur-segment, $H^5$, pivoted upon the adjacent casting $H^2$, and provided on its outer side with a pin, $h^4$, which travels in a grooved guide, $H^6$, supported upon the main frame. This guide extends upward a considerable distance, and then is bent at an angle, as represented in dotted lines in Fig. 2, the purpose of which will be presently explained.

The operation of the apparatus is as follows: The platform is first lowered to its lowest point, and the mold closed and secured. Steam or hot water is then admitted and caused to circulate through the lower portions of the core-tubes, the steam-head, and the jacket of the mold. A small portion of the material to be used in the casting (preferably an asphaltum compound) is then placed in the mold, in a plastic or semi-liquid state, and the plunger dropped within the mold to tamp it down or submit it to pressure by means of the cylinders H H, and this is repeated till the mold is full, the heat from the circulation of steam or hot water through and around the mass, keeping it in a plastic state and preventing one portion from cooling before another is formed. When the mold is full, water is admitted below the pistons $F'$ in the cylinders F, and the platform B, with the mold and cylinders H H, are all lifted together. This draws the casting upward over the core-tubes, loosening it therefrom, and smoothing and finishing the wire-cells, and the platform may be stopped at any desired point, the brake being then applied to retain it in position should any settling or leak occur in the hydraulic cylinders. This platform is raised till the lower end of the mold is opposite the solid central portions of the core-tubes, and there it is held till the material is sufficiently cooled by the circulation of cool water through the upper portions of these tubes, which are now within the casting. The steam, having been cut off from the hollow jacket of the mold, may now be replaced by cold water, if found desirable, to effect the cooling more rapidly. In this position the frame E and its appliances have been raised with and retain the same position with reference to the platform B, and the pin $h^4$, having traveled up in the guide $H^6$, is at this time near the lower end of the inclined or bent portion of this guide. When the casting is cooled, the water-circulation is cut off and the platform is again started on its upward course. At the time this upward motion commences the hollow plunger has been drawn up around the water-head, (the interior of the plunger being provided with guides similar to the flanged guides $E^3$, by which the water-head is retained in proper position,) and the pinion $h^2$ meshes with the rack-bar $H^4$. The pin $h^4$ now enters the inclined portion of the guide $H^6$ and throws over the segment $H^5$, acting through the shaft $H^3$ and its spur-wheels to lift the rack-bar $H^4$, and with it the water-head, with a much greater speed than that imparted to the main portions of the apparatus. This draws the core-tubes D' out of the rubber nipples in the water-head and lifts the inner tubes out of the outer ones, the inner tubes rising till their lower ends are held within the end of the plunger, and the casting and its mold are lifted till the upper ends of the cores are inclosed within the bell-former; and in this position the mold may be readily unlocked and swung open, when the casting is free to be lifted out and carried away till wanted for use. When the mold is again closed and the platform descends, the action of all the parts is exactly the reverse of that just described, and the core-tubes (both inner and outer) being held by the plunger and bell-former in proper position, there is no difficulty in entering them in place.

It is obvious that the movable platform may be supplied with two or more of the molds and corresponding core-tubes if desired to increase the capacity of the device.

Having thus fully described my invention, what I claim as new, and desire to secure by Letters Patent, is—

1. In an apparatus for casting cellular sections for underground electrical conduits, a mold in which the sections are formed, in combination with a series of hollow core-tubes, through one part of which a heating agent is caused to circulate, and in the other part a cooling agent is circulated, and means for moving the mold with its cast section upon the core-tubes from one portion to the other, substantially as shown and described.

2. In an apparatus for casting cellular sections for underground electrical conduits, a series of cell-cores, each consisting of two tubes, one within the other, one of which is connected to a supply and the other to an exhaust chamber or pipe, whereby a constant circulation of heating or cooling agents may be produced through the mold during the process of casting, substantially as shown and described.

3. In an apparatus for casting cellular sections for underground electrical conduits, a series of cell-cores, each consisting of a tube having its central portion plugged or made solid, and one end permanently secured in a supply-chamber, through which a heating agent is passed, and the other removably connected to a chamber through which a cooling agent is passed, in combination with two smaller circulating-pipes entering the hollow cores from opposite ends, one of which is permanently secured therein and the other adapted to be withdrawn therefrom, substantially as shown and described.

4. In an apparatus for casting cellular sections for underground electrical conduits, a main frame provided with a mold or casing having a series of cores for forming the wire-cells, and having means for moving it upon said cores, in combination with a hollow plunger or piston for tamping down the material, and means for giving this plunger a motion either in conjunction with or independent of the movement of the casing, substantially as shown and described.

5. In an apparatus for casting cellular sections for underground electrical conduits, a frame having a stationary steam-head divided into two chambers connected with suitable supply and exhaust pipes, a series of double core-tubes, through one end of which steam is caused to circulate from the steam-head, and the other end having a circulation of water from a double-chambered water-head above the cores, in combination with a movable platform carrying a casing or mold surrounding the cell-cores, and means for moving this casing from one end of the cores to the other, whereby the material is kept heated during the process of filling the mold, and cooled by being drawn off to the opposite ends of the cores under the effects of the water circulation, substantially as shown and described.

6. In an apparatus for casting cellular sections for underground electrical conduits, the combination, with a series of hollow core-tubes through which a circulation of steam or water is induced, of a steam or water head provided with elastic nipples adapted to receive and retain the ends of the core-tubes, but admitting of the head being withdrawn to allow of the casting being drawn off the cores, substantially as shown and described.

7. In an apparatus for casting cellular sections for underground electrical conduits, a water-head divided into two compartments from one of which depends a series of tubes, and provided with means for advancing and retracting it, in combination with a series of hollow core-tubes secured in the main frame, into which the depending tubes extend, and the upper ends of which are received and held by one of the chambers of the water-head, substantially as shown and described.

8. In an apparatus for casting cellular sections for underground electrical conduits, a main frame having a stationary series of cell-cores, and two or more stationary hydraulic cylinders, each provided with a piston, in combination with a movable platform connected to said pistons, and carrying a casing or mold surrounding the cell-cores, substantially as shown and described.

9. In an apparatus for casting cellular sections for underground electrical conduits, a main frame having a series of stationary cores, and a movable platform carrying the mold or casing, and operated by hydraulic cylinders secured on the frame, in combination with an auxiliary movable frame carrying a plunger adapted to be projected within the mold, and two or more hydraulic or steam cylinders supported upon the movable platform and connected to the movable frame, whereby the frame and plunger are given a movement either in conjunction with or independent of the platform and its mold, substantially as and for the purpose set forth.

10. In an apparatus for casting cellular sections for underground electrical conduits, the core-tubes $D'$, formed solid at their center, in combination with the inner tubes, $D^2$ $d^5$, entering the others from opposite ends, one end of the main tubes having a circulation of steam and the other of cool water, substantially as and for the purpose set forth.

11. In an apparatus for casting cellular sections for underground electrical conduits, the water-head G, formed into two chambers, one of which is provided with the small tubes $d^5$ and the other with a series of elastic nipples, $G^5$, in combination with the tubes $D'$, adapted to receive the tubes $d^5$, and having their ends removably entered in the nipples, substantially as and for the purpose set forth.

12. In an apparatus for casting cellular sections for underground electrical conduits, the combination, with the stationary series of core-tubes $D'$, of a vertically-sliding head, G, divided into compartments, with one of which the tubes $D'$ connect, and the other having a series of smaller tubes, $d^5$, adapted to enter the core-tubes, and the supply and exhaust pipes $G'$ $G^2$, telescoped within the pipes $G^3$, as the head rises and falls, substantially as and for the purpose set forth.

13. In an apparatus for casting cellular sections for underground electrical conduits, the main frame A, movable platform B, casing $C'$, and cell-cores $D'$, formed as herein described, in combination with the frame E, with its plunger $E^2$, the water-head G, having a rack-bar, $H^4$, the shaft $H^3$, with its gears $h^2$ $h^3$, segment $H^5$, having a pin, $h^4$, and the bent or inclined guide $H^6$, substantially as and for the purpose set forth.

14. In an apparatus for casting cellular sections for underground electrical conduits, the main frame A, having rack-bars $b^2$, in combination with the movable frame B, provided with the shafts $B^3$, carrying pinions $b'$, substantially as and for the purpose set forth.

15. In an apparatus for casting cellular sections for underground electrical conduits, the combination, with the main frame and its rack-bars, of the movable platform B, having shafts $B^3$, carrying spur-gears $b'$, and also the belt-wheels $B^4$, belt $b^3$, brake-lever $B^5$, and segment-rack $B^6$, substantially as and for the purpose set forth.

16. An apparatus for casting cellular sections for underground electrical conduits, consisting, essentially, of a main frame having a series of stationary double core-tubes, through opposite ends of which heating and cooling agents are caused to circulate from a stationary steam-head and a movable water-head, a movable platform carrying a jacketed casing or mold, a movable frame carrying a plunger or piston adapted to enter the mold, and means for giving the water-head and plunger-frame movements independent of the mold, all constructed, combined, and arranged to operate substantially as herein described, whereby the casting is formed around the heated portion of the core-tubes, then drawn up to their other ends to cool, and finally drawn off them altogether at the same time the water-head and its circulating-tubes are drawn out of the way and the casting left free for removal.

In testimony whereof I affix my signature in presence of two witnesses.

BENEZETTE WILLIAMS.

Witnesses:
W. C. McArthur,
Chas. Kressmann.